Patented Aug. 14, 1945

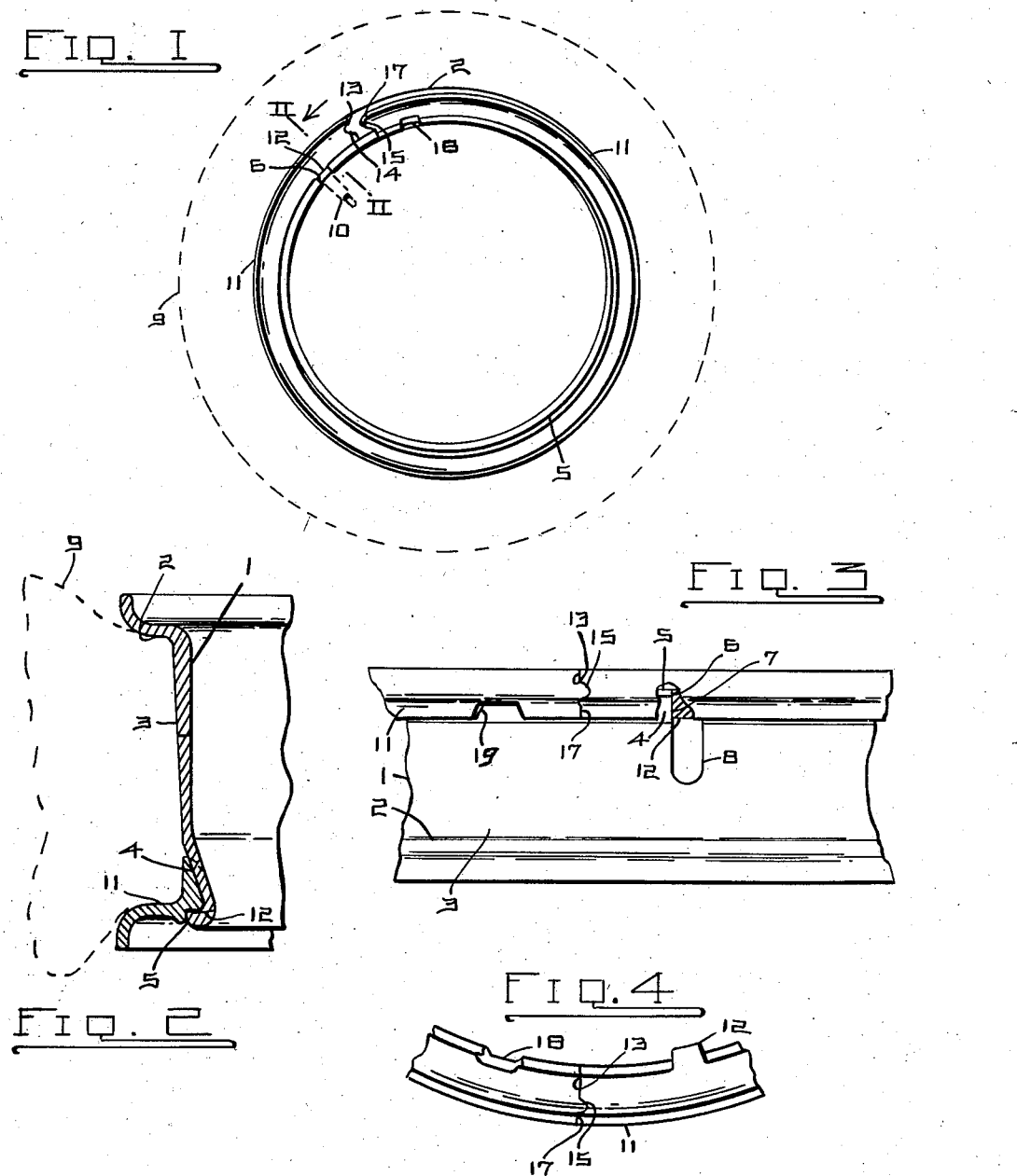

2,381,963

UNITED STATES PATENT OFFICE 2,381,963

EQUIPMENT FOR TIRE RETREADING

Axel Leonard Anderson, Toledo, Ohio

Application November 25, 1943, Serial No. 511,655

1 Claim. (Cl. 154—9)

This invention relates to re-treading of pneumatic tire casings.

This invention has utility when incorporated in a tire casing seating and holding rim complete with a flange during the extra pressure special tube inflation therein at the interval of heat treatment and forming and molding.

Referring to the drawing:

Fig. 1 is a side elevation of the special re-treading rim hereunder, with the flange lug entered at the valve stem slot, the flange as extending therefrom being in readiness to be progressively jammed therefrom into fully seating position;

Fig. 2 is an enlarged section on the line II—II, Fig. 1, looking in the direction of the arrow, showing the seating relation between the major rim section and the flange;

Fig. 3 is a plan view of a portion of the rim inner side, or the side toward the tire or casing, with the flange properly seated therewith; and Fig. 4 is a detail view looking down on the flange section of Fig. 3, showing the lug for the valve stem slot and its proximity to the flange joint.

In the re-treading practices hereunder, there is provided a rim 1 having integral therewith a tire casing bead holding flange 2. The rim 1 has a seat 3 radially outward which has a slight bevel or reduced diameter to a seat 4 of more sharp taper and having a slightly undercut minor flange 5, leaving a peripheral clearway to the casing seat 3 and the casing bead seat or flange 2. The flange 5 has an opening 6 with a connection way 7 forming a radial clearance, radial clearway region, interruption, opening or gap providing a slot 8 in the seats 4, 3, for a valve stem. For facilitating operation to permit the operator easily and readily to slide the casing having the inner tube therein, into position for casing 9 to ride with one bead against the flange 2 and the valve stem 10 to move into the slot 8, the diameter of the seat 3 is slightly sub-standard. For an 18" inside diameter casing, the seat 3 as beveled may be from 1/16" to 1/64" less diameter. Accordingly the casing, as but partially inflated to hold to form, conveniently takes a centered true position.

To complete the holding structure for the casing 9, a flange 11, complementarily symmetrical as to the flange 2, is provided. From its inner face there projects a lug 12 spaced slightly from an end 13 of the flange 11. The flange end 13 has a notch 14 to register with a projection 15 of complementary end 17 for the flange 11. Remote from the lug 12 and near the end 17, the flange 11 has at its outer base a notch 18. The minor element or flange 11 may be assembled with the major element or rim 1. In so doing, with the lug 12 to act as a plug at the outer or open end of the slot 8, the notch 18 near the opposite end of the element 11, is in registering position with a notch 19 in the element 1.

From the disclosure herein it follows that the particular embodiment is special for the particular casing, say 18 x 5, insuring that the bead for the casing 9 as originally provided therein, is not disturbed, but is preserved in identity in the re-treading. As the flange 2 is that for the casing 9 initially, likewise the casing bead seat or flange 11 is identical in its flange form, supplemented as herein. The seat 3 is desirably of slightly reduced diameter, which permits the ready assembly of the inflated casing thereon. Furthermore, and of greater importance is this slight undersize at the completion of the treatment or curing. Even though the unit may not be fully cooled, the flange 11 readily may be released by a screw driver pry at the notch 18, and worked free therefrom. Then, merely dropping of the rim section 1 clear of the casing has such in readiness for a succeeding job.

The presence of the lug 12 in the clearance openings 6, 7, holds the seat 4 and the portion of the seat 3 as weakened by the slot 8, from distortion or even slight collapse. The co-operative relation therefrom is that the flange 11, thereby is in position for as full and symmetrical bead forming or molding as the companion flange 2.

Under the efficient and preferred practice for adoption hereunder, the special major and minor rim section for re-treading are good for such range of styles of tread as it may be desired to develop from the mold or molds therefor. However, for the casing inside diameter and its carcass cross section dimension, it is the purpose of applicant to have each rim section conform exactly with the flange for the casing bead as initially for such casing. A special or heavy inner tube may be adopted for the re-treading treatment as in vulcanizing. As the next step, such special tube may be placed in the tire casing to be subjected to the re-treading treatment. Then a little inflation may be had properly to locate such inner tube in the casing, so that it as a unit may be thrust over the seat portions 4, 3, with the valve stem as radially inward passing into the slot 8. When the casing is thrust to have the bead of one side snugly against the flange 2, the minor rim section may have its flange 11 against the opposite side of the casing 9. The first step in this handling of the section 11, is to have the lug 12 in the opening way 6, 7, to close the outside or entrance to the slot 8. The placing of the flange is from there completed by thrusting back of the minor flange 5 to have its ends 13, 17 abut with the projection 15 in the notch 14. The excessive pressures now applied with the heat, are effectively resisted in this assembly to undergo the treatment. Upon the completion of the re-treading operation as to the molding and vulcanizing, it is not required that the special rim sections herein disclosed be left with the casing for the whole unit to cool. At once upon release of the pressure, the minor section 11 may be pried loose. As the major section is thus freed, it will drop clear of the casing. The sections, even tho still hot, are ready for re-use. The prying loose of the minor section 11 is conveniently and readily achieved by insertion of a screw driver or other prying tool into the recess or notch 18 as exposed. As such tool is thrust into the notch 18 it should project therebeyond into the notch 19, so that the pry or lever action of the tool may at once spring the minor element 11 free of the major element 1.

What is claimed and it is desired to secure by Letters Patent is:

Equipment for tire casing re-treading, consisting of an endless rim first section having a casing seat integral with an endless flange for the casing bead seat, said section, from the side thereof remote from the endless flange and directly inward just beyond the medial portion of the casing seat, having its continuity interrupted by a slot completed by the two sides from the medial portion to leave full clearway for a tire valve stem to project radially inward thru the section from an inner tube seated in a casing on the section, whereby a tire casing with an inner tube therein, may have the valve stem therefrom protrude normally in thrusting the casing with the contained inner tube over the section toward the endless flange with the valve stem registering to ride lengthwise of the slot, and an equipment completing assembly complementary split ring flange second section to oppose the endless flange of the first section, and provided with an integral lug to enter the outer open end of the slot clear of the valve stem, thereby to hold the first section against collapse on inflation of the inner tube.

AXEL LEONARD ANDERSON.